Figure 1:
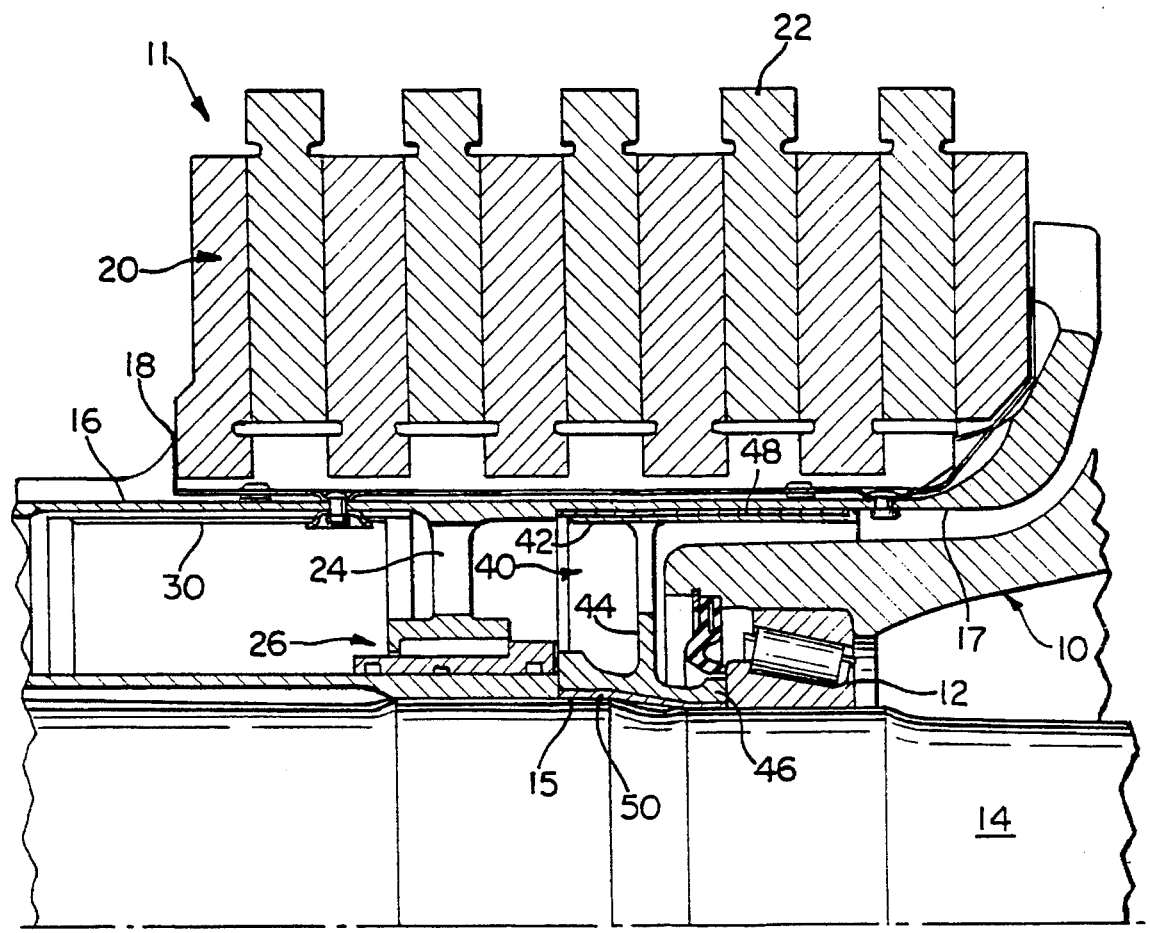

United States Patent [19]

Patko

[11] Patent Number: 5,485,898
[45] Date of Patent: Jan. 23, 1996

[54] SPACER MEMBER FOR AIRCRAFT BRAKES

[75] Inventor: Joseph M. Patko, South Bend, Ind.

[73] Assignee: AlliedSignal Inc., Morristown, N.J.

[21] Appl. No.: 263,708

[22] Filed: Jun. 22, 1994

[51] Int. Cl.⁶ .................................................. F16D 55/36
[52] U.S. Cl. .................. 188/71.5; 188/18 A; 188/205 R; 188/264 G; 192/110 B; 192/115; 301/6.2
[58] Field of Search .................................. 188/18 A, 71.5, 188/264 G, 218 XL, 18 R, 71.6, 205 R, 206 R, 264 W; 301/6.2, 6.8, 6.1, 6.10; 244/111, 110 A, 121; 192/70.16, 70.2, 70.19, 115, 110 B, 70.11; 384/277, 913

[56] References Cited

U.S. PATENT DOCUMENTS

| | | |
|---|---|---|
| 2,826,274 | 3/1958 | Albright . |
| 2,914,140 | 11/1959 | Werner . |
| 2,916,105 | 12/1959 | Dasse et al. . |
| 2,954,850 | 10/1960 | Cislo . |
| 4,117,912 | 10/1978 | Ruppe, Jr. . |
| 4,696,376 | 9/1987 | Reynolds ............................. 188/71.5 |
| 4,805,744 | 2/1989 | Pringle . |
| 4,878,563 | 11/1989 | Baden et al. . |
| 5,062,503 | 11/1991 | Black et al. . |
| 5,316,111 | 5/1994 | Layfield ............................. 188/205 R |
| 5,323,881 | 6/1994 | Machan et al. ..................... 188/18 A |

FOREIGN PATENT DOCUMENTS 2161560A  1/1986  United Kingdom .

Primary Examiner—Douglas C. Butler
Attorney, Agent, or Firm—Larry J. Palguta; Leo H. McCormick, Jr.

[57] ABSTRACT

An aircraft brake (11) typically includes a torque tube (16) supported by a pedestal (24) upon an axle (18). The torque tube (16) is connected with the plurality of stators (20) which interface with a plurality of rotors (22) connected with a surrounding wheel (10). In order to improve the configuration stability of torque tube (16) during operation of the brake (11), a spacer member (40) is located between the inner diameter surface (17) of the torque tube (16) and the outer diameter surface (15) of the axle (14). The spacer member (40) has an outer diameter surface (42) which supports the inner diameter surface (17) of the torque tube (16) and an inner diameter surface (46) which is supported by the axle (14). A splined support ring (50) engage splines (47) at the inner diameter surface (46) of the spacer member (40) and is press fitted to the axle (14).

11 Claims, 1 Drawing Sheet

SPACER MEMBER FOR AIRCRAFT BRAKES

The present invention relates generally to aircraft wheels and brakes, and in particular to a spacer member for a torque tube of the aircraft brake.

in an aircraft brake, a torque tube is typically connected with a piston housing and both located about an axle. The torque tube through a series of splines is connected with a plurality of stators discs, while a plurality of rotor discs are connected with a wheel located thereabout. The torque tube usually includes a pedestal which extends radially inwardly to a foot that is supported upon the outer diameter of the axle. The torque tube locates the stator discs relative to the brake, provides a thermal barrier for the axle, locates the brake frame, increases whirl stability and adds damping, in addition to its obvious function of providing a mechanism for removing braking torque during brake operation. However, during brake operation the torque tube can change its annular configuration due to the braking torque, experience some whirl instability, experience some torsional movement, and experience squeal vibrations. It is highly desirable to provide a mechanism by which the configuration of the torque tube can be better maintained during braking application, improved whirl stability can be provided, torsional damping increased, and squeal vibrations reduced.

The present invention can provide solutions to the above by providing a spacer member of an aircraft brake, the aircraft brake comprising a torque tube located about an axle and the torque tube connected with a plurality of discs of the aircraft brake, the spacer member located between an inner diameter surface of the torque tube and an outer diameter surface of the axle, the spacer member having an outer diameter surface which supports the inner diameter surface of the torque tube and an inner diameter surface which is supported by the axle, the spacer member providing configuration stability and support for the torque tube.

Figure 2:
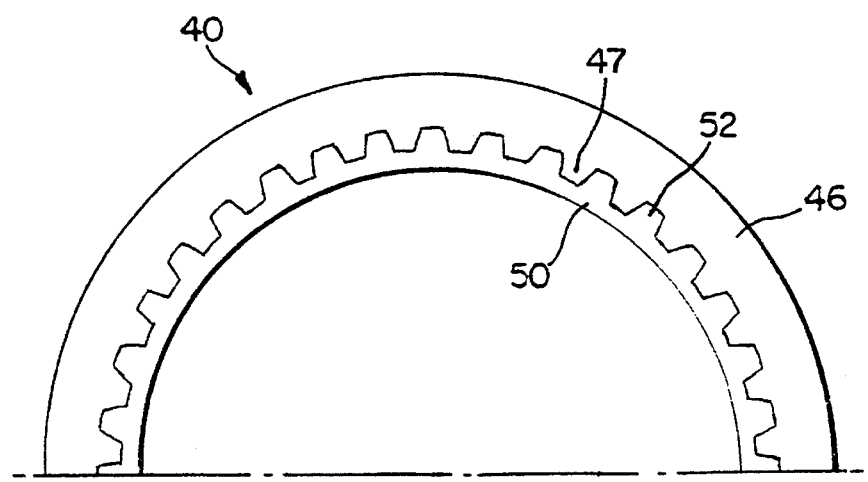

One way of carrying out the invention is described in detail below with reference to the drawings which illustrates an embodiment in which:

FIG. 1 illustrates a partial section view of an aircraft brake which includes the spacer member of the present invention; and FIG. 2 is a partial end view of the splined interface between the spacer member and support ring.

FIG. 1 is a partial section view of an aircraft wheel and brake. The aircraft wheel, designated generally by reference numeral 10, is supported by bearing means 12 located about an axle 14. Located about axle 14 is an aircraft brake 11 (partially illustrated) having a torque tube 16 (connected with a not shown piston housing) which includes a plurality of splines 18 that connect with slots (not shown) of a plurality of stator discs 20. Interleaved with stator discs 20 is a plurality of rotor discs 22 which engage not shown splines of the wheel. Torque tube 16 includes an integral pedestal 24 located upon a bushing assembly indicated generally by reference numeral 26. A heat shield 30 is located about a portion of the inner diameter surface 17 of torque tube 16. Located between the inner diameter surface 17 of torque tube 16 and the outer diameter surface 15 of axle 14 is a spacer member designated generally by reference numeral 40. Spacer member 40 includes an outer diameter surface or axially extending portion 42, a radially extending portion 44, and an inner diameter surface or axially extending portion 46. Outer diameter surface or axially extending portion 42 engages and/or supports the inner diameter surface 17 of torque tube 16. Portion 42 may also include a coating or sleeve 48 for engagement with inner diameter surface 17 of torque tube 16. The coating may be aluminum bronze and the sleeve may be either copper beryllium or aluminum bronze, in order to improve frictional contact with inner diameter surface 17 and to prevent galling. The spacer member may be made of stainless steel, and depending upon its composition the use of the coating or sleeve 48 is optional. The inner diameter surface or axially extending portion 46 is supported by the outer diameter surface 15 of axle 14, and is retained axially in position by the pedestal 24 and bearing means 12. A support ring 50 may be press fitted on the outer diameter surface of axle 14 so that it is positioned non-rotatably relative to axle 14, and include at its outer diameter a plurality of splines 52 which interface with a plurality of splines 47 (see FIG. 2) on the inner diameter surface or axially extending portion 46, such that support ring 50 and axially extending portion 46 are fixed to one another to prevent rotation therebetween. The ring 50 may be made of either aluminum bronze or copper beryllium.

The spacer member of the present invention may provide significant advantages for an aircraft brake. It is envisioned that the spacer member could provide improved configuration stability whereby the torque tube will have increased barrel stiffness during braking operation. The spacer member could provide greater whirl stability for the torque tube, increased torsional damping, reduced squeal vibrations during brake operation, and may be easily removed and repaired. It is envisioned that the spacer member can result in less machining of the torque tube forging, and may possibly provide for the elimination of the existing torque tube pedestal. It is envisioned that the spacer member of the present invention can provide the above-described advantages in order to improve overall performance of the aircraft brake.

I claim:

1. An aircraft brake including a spacer member, the aircraft brake comprising a torque tube located about an axle and the torque tube connected with a plurality of discs of the aircraft brake, the torque tube including a pedestal which is integral with the torque tube and extends radially inwardly for support via bushing means by said axle, the spacer member located between an inner diameter surface of the torque tube and an outer diameter surface of the axle, the spacer member having an outer diameter surface including a coating thereabout which supports the inner diameter surface of the torque tube and an inner diameter surface which is supported by the axle, the coating providing improved frictional contact with the inner diameter surface of said torque tube in order to minimize galling, and a support ring disposed between the inner diameter surface of said spacer member and the outer diameter surface of the axle, the support ring and spacer member each including respective splines to effect therebetween a splined interface that prevents rotation relative to one another, whereby the spacer member provides configuration stability and support for the torque tube.

2. The aircraft brake in accordance with claim 1, wherein the support ring is press fitted upon the axle.

3. The aircraft brake in accordance with claim 1, wherein the spacer member is located and retained axially between bearing means, disposed about the axle, and the pedestal.

4. The aircraft brake in accordance with claim 1, wherein the coating is aluminum bronze.

5. The aircraft brake in accordance with claim 1, wherein the spacer member is made of stainless steel.

6. An aircraft brake including a spacer member, the aircraft brake comprising a torque tube located about an axle and the torque tube connected with a plurality of discs of the aircraft brake, the torque tube including a pedestal which is integral with the torque tube and extends radially inwardly for support via bushing means by said axle, the spacer member located between an inner diameter surface of the torque tube and an outer diameter surface of the axle, the spacer member having an outer diameter surface including a sleeve thereabout which supports the inner diameter surface of the torque tube and an inner diameter surface which is supported by the axle, the sleeve providing improved frictional contact with the inner diameter surface of said torque tube in order to minimize galling, and a support ring disposed between the inner diameter surface of said spacer member and the outer diameter surface of the axle, the support ring and spacer member each including respective splines to effect therebetween a splined interface that prevents rotation relative to one another, whereby the spacer member provides configuration stability and support for the torque tube.

7. The aircraft brake in accordance with claim 6, wherein the support ring is press fitted upon the axle.

8. The aircraft brake in accordance with claim 6, wherein the spacer member is located and retained axially between bearing means, disposed about the axle, and the pedestal.

9. The aircraft brake in accordance with claim 6, wherein the sleeve is made of copper beryllium.

10. The aircraft brake in accordance with claim 6, wherein the sleeve is made of aluminum bronze.

11. The aircraft brake in accordance with claim 6, wherein the spacer member is made of stainless steel.

* * * * *